United States Patent [19]

Weinfurtner

[11] Patent Number: 5,706,351
[45] Date of Patent: *Jan. 6, 1998

[54] PROGRAMMABLE HEARING AID WITH FUZZY LOGIC CONTROL OF TRANSMISSION CHARACTERISTICS

[75] Inventor: Oliver Weinfurtner, Erlangen, Germany

[73] Assignee: Siemens Audiologische Technik GmbH, Erlangen, Germany

[*] Notice: The term of this patent shall not extend beyond the expiration date of Pat. No. 5,604,812.

[21] Appl. No.: 393,681

[22] Filed: Feb. 24, 1995

[30] Foreign Application Priority Data

Mar. 23, 1994 [EP] European Pat. Off. .............. 94104619

[51] Int. Cl.$^6$ .................................................. H04R 25/00
[52] U.S. Cl. ........................ 381/68.2; 381/68.4; 395/900
[58] Field of Search ........................ 381/68, 68.2, 68.4, 381/56, 94, 98, 103, 106, 107, 86, 60; 395/900

[56] References Cited

U.S. PATENT DOCUMENTS

| | | | |
|---|---|---|---|
| 4,425,481 | 1/1984 | Mansgold et al. | 381/68.2 |
| 4,716,540 | 12/1987 | Yamakawa | 364/807 |
| 5,172,417 | 12/1992 | Iwamura | 381/103 |
| 5,218,542 | 6/1993 | Endo et al. | 364/424.02 |
| 5,292,995 | 3/1994 | Usa | 395/900 |
| 5,351,200 | 9/1994 | Impink, Jr. | 395/900 |
| 5,434,926 | 7/1995 | Watanabe et al. | 381/86 |
| 5,604,812 | 2/1997 | Meyer | 381/68.2 |
| 5,606,620 | 2/1997 | Weinfurtner | 381/68.4 |

FOREIGN PATENT DOCUMENTS

| | | |
|---|---|---|
| 0064642 | 1/1986 | European Pat. Off. . |
| 0341997 | 11/1989 | European Pat. Off. . |
| 0398536 | 11/1990 | European Pat. Off. . |
| 4225758 | 2/1994 | Germany . |

*Primary Examiner*—Huyen D. Le
*Attorney, Agent, or Firm*—Hill, Steadman & Simpson

[57] ABSTRACT

The programmable hearing aid has a fuzzy controller allocated to the amplifier and transmission circuit, which is connected between the microphone and the earphone, for automatic switching and matching of the transmission characteristics to the current ambient situation. The fuzzy controller undertakes a selection of the parameter sets or parameters stored in a data carrier of the hearing aid for the modification of transmission characteristics of the hearing aid dependent on input quantities characteristic of the current ambient situation.

24 Claims, 10 Drawing Sheets

PROGRAMMABLE HEARING AID WITH FUZZY LOGIC CONTROL OF TRANSMISSION CHARACTERISTICS

BACKGROUND OF THE INVENTION

1. Field of the Invention

The present invention is directed to a programmable hearing aid of the type having an amplifier and transmission circuit whose signal transmission parameters can be adjusted to various transmission characteristics between the microphone and the earphone, wherein parameter sets for different ambient auditory situations can be stored, and whereby the transmission characteristic of the amplifier and transmission circuit can be automatically switched to an allocated parameter set dependent on the current ambient auditory situation.

2. Description of the Prior Art

In a hearing aid of this type disclosed in European Application 0 064 042, eight sets of parameters for different transmission characteristics for different ambient auditory situations are stored in a hearing aid memory. By actuating a switch, the different parameter sets for the eight stored programs can be retrieved successively. A control unit controls a signal processor connected between the microphone and the earphone, this signal processor then setting a first transmission function intended for a predetermined ambient situation. The stored signal transmission programs, however, can only be successively retrieved via the switch until the transmission function matching the given ambient situation has been found to the satisfaction of the person wearing the hearing aid. An automatic switching to a different transfer function should also be provided according to European Application 0 064 042 when the user moves, for example, from a noisy environment into a quiet environment or vice versa. Without disclosing a solution achieving the automatic switching, it is stated that this switching is to ensue cyclically, like the manual switching. If one wished to set transfer functions other than the stored transfer functions, then the non-volatile memory must be erased by an external programming unit and must be reprogrammed by the latter. An adaptation of the programmable hearing aid to changing hearing impairment is also possible in this way.

SUMMARY OF THE INVENTION

An object of the present invention is to provide a programmable hearing aid having a control system which enables an automatic, signal-dependent selection and setting of auditory situations based on stored signal processing parameters, by means of evaluation of input signals or measured signals according to prescribable rules.

This object is inventively achieved in a programmable hearing aid of the type described having a controller allocated to the amplifier and transmission circuit for automatic switching, the controller undertaking a selection of the parameter sets stored in a data carrier or a selection of individual parameters, for varying transmission characteristics dependent on the input quantities characteristic of the current ambient situation, and wherein a fuzzy logic controller is provided as the controller.

In the hearing aid of the invention, parameters and/or parameter sets are stored in a data carrier, these being available for a meaningful setting of the signal processing means of the hearing aid dependent on specific acoustic situations (for example, at rest, i.e. without disturbing background noises, or given speaking situations having low-frequency, unwanted noise, etc.). The invention thereby enables an automatic, signal-dependent selection of the optimally stored signal processing characteristic of the hearing aid for a specific auditory situation. According to the invention, input signals or measured signals that identify the actual auditory situation are evaluated in the hearing aid according to prescribable rules and the automatic setting that is matched to the respective auditory situation is then activated in the hearing aid. This inventively ensues with a controller in the hearing aid that operates based on the principles of the fuzzy logic.

In an embodiment, a fuzzy logic controller is provided in the hearing aid as the controller. This embodiment makes it possible to set arbitrary sets of rules for the selection behavior. The circuit realization of the fuzzy logic principle is preferably accomplished in analog circuit technology since the demands such as low power consumption, low area, etc., that are specifically associated with hearing aids can only be satisfied in this way given the current status of semiconductor technology.

According to one embodiment of the invention, the controller selects stored parameter sets or individual parameter values given a change in the acoustic ambient situation and thus effects a discontinuous variation of the transmission behavior. Thereafter, the signal transmission characteristics corresponding to the current auditory situation are formed employing complete, stored parameter sets, or only the required, individual parameters are accessed. The switch from one signal processing characteristic to another is still step-by-step according to this embodiment.

According to a further embodiment of the invention, the controller defines control signals from the input quantities identifying the current ambient situation, these control signals leading to a continuous modification of the transmission behavior.

DESCRIPTION OF THE PREFERRED EMBODIMENTS

Figure 1:
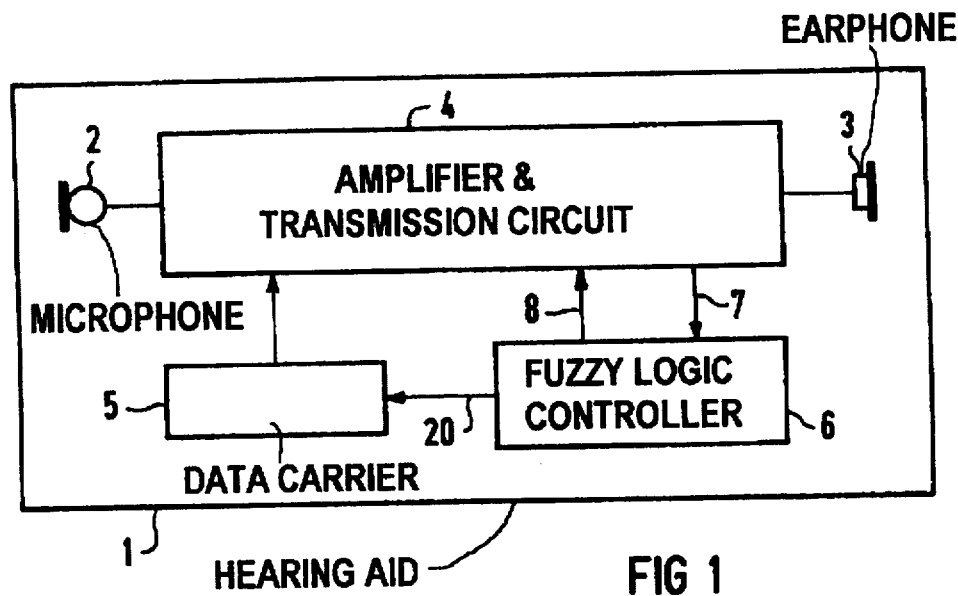
FIG. 1 is a block circuit diagram of a programmable hearing aid of the invention.

The hearing aid of the invention has a housing 1 of a size to be worn by a user, such as an ITE housing or a BTE housing. The housing 1 contains all of the components schematically shown in FIG. 1, including a microphone 2 which picks up acoustic signals. This acoustic information is converted into electrical signals in the microphone 2. After signal preprocessing in an amplification and transmission circuit 4, the electrical signal is supplied to an earphone 3 serving as an output transducer. In order to avoid an additional acoustic transducer or some other sensor, at least one input quantity or measured quantity 7 that represents a quantity identifying the current ambient situation/auditory situation can be tapped from the signal path between the microphone 2 and the earphone 3 according to the exemplary embodiment. The hearing aid 1 further includes a data carrier 5 in which parameters and/or parameter sets for hearing aid characteristics suitable for different ambient situations can be stored. The hearing aid 1 also contains a controller 6 that is allocated to the amplifier and transmission circuit 4 and that undertakes a selection of the parameter sets or parameters stored in the data carrier 5 dependent on the input quantities 7 identifying the current ambient situation/auditory situation, for modifying the transmission characteristics of the hearing aid 1.

A fuzzy logic controller is preferably provided as the controller 6, the fuzzy logic controller producing control signals 8 from the input quantities 7 identifying the current ambient situation, the control signals 8 resulting in a continuous modification of the transmission behavior of the hearing aid.

In a simple embodiment, the controller 6 can effect a step-by-step matching of the transmission characteristic of the hearing aid given a changing auditory situation. A continuous modification of the transmission behavior of the hearing aid is also possible, however, with the controller 6 by means of the controller 6 directly defining continuous setting quantities of individual signal processing parameters.

The input or measured signal 7 is taken from the signal path or from the signal paths of the frequency channels in the case of a multi-channel hearing aid at all relevant points or at selected relevant points and is preprocessed in a suitable way in an preprocessing stage 12 (for example, by rectification, formation of suitable, temporal averages, as well as, possibly their derivatives). These preprocessed signals 16, 17 and 18 as well as possibly further system information 22 (for example, whether a microphone mode or a telephone mode is desired) are supplied to a fuzzification stage 9 and to an inference-forming stage 10. The outputs of the controller 6 are in the form of control signals 20 that effect the setting of the auditory situations or represent the setting quantities 8 of individual signal processing parameters.

Figure 2:
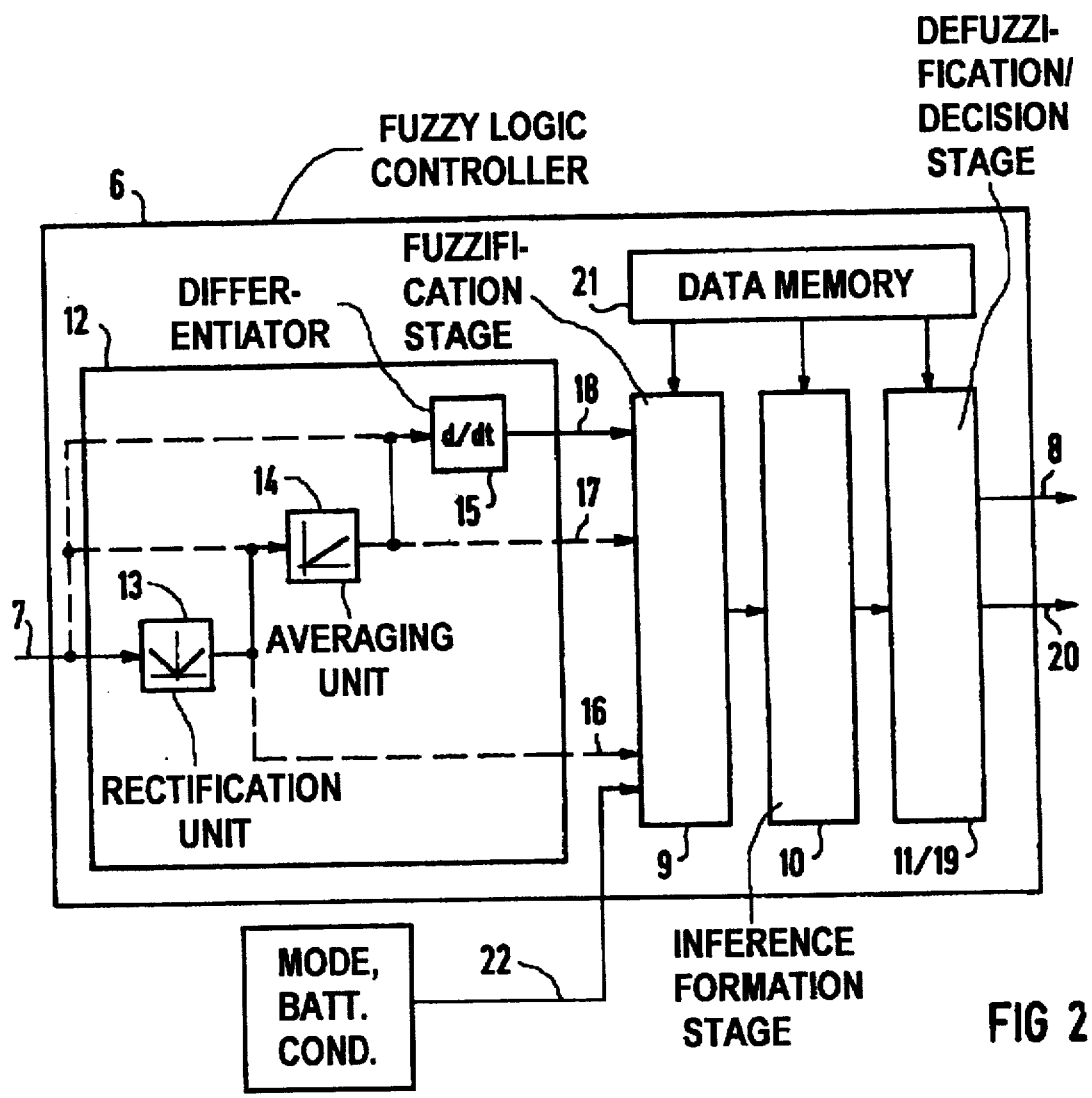
FIG. 2 illustrates an embodiment of the fuzzy logic controller with a signal preprocessing unit for use in the hearing aid according to FIG. 1.

FIG. 2 shows the principle of a fuzzy logic controller for signal processing functions. Preprocessed signals 16–18 are acquired from at least one measured quantity 7 (input quantity), for example by rectification in a rectifier unit 13 and/or by averaging in an averager 14 (formation of a temporal average) and/or time differentiation (d/dt) in a differentiator. The edited signals 16–18 are supplied to the fuzzification stage 9 of the fuzzy logic controller 6. In a known embodiment, the fuzzification stage 9 of the fuzzy logic controller 6 is also followed by an inference-forming stage 10 as well as by a defuzzification stage 11.

According to one embodiment, the fuzzy logic controller 6 contains the components for signal preprocessing stage 12, the fuzzification stage 9 and the inference forming stage 10 as well as a decision stage 19 that forms crisp output values 20 from incoming fuzzy signals by selection from a predetermined set of output values, whereby measured quantities from the signal path between the microphone 2 and the earphone 3 are supplied to the signal preprocessing stage 12 as input quantities 7 and these input quantities 7 are processed in the signal preprocessing stage 12 in the manner described above and the preprocessed signals 16, 17 and 18 are supplied to the fuzzification stage 9.

In a further embodiment of the invention, the control behavior of the controller 6 is defined by a set of rules. This set of rules is partially implemented in the structure of the controller, and a data memory 21, for example an EEPROM, wherein configuration information (rule base, knowledge base) are stored in a fetchable manner for the controller components is allocated to the controller 6.

The set of rules of the fuzzy logic controller 6 is not an independent function block in the exemplary embodiment but is partially implemented in the structure of the components 9–11. The set of rules (if ... then .... description of the controller behavior) is thus contained substantially invariably in the hardware structure of the components 9–11.

The following, possible generalizations can be made from the embodiment of FIG. 2:

The formation of the temporal average (as well as, possibly, the appertaining differentiation) can occur multiply with different time constants in order to be able to react specifically to variations of the signal level at different speeds.

The signal can also be supplied directly to the fuzzification stage 9, i.e. without the formation of a temporal average, in order to be able to react to signal peaks or spikes.

Further signals 22 such as system information signals about the current state of the switch which sets the microphone/telephone coil position or for identifying the battery condition of the hearing aid, can be supplied to the fuzzification stage 9, whereby these signals 22 are co-processed by the controller for producing the crisp output values 8 or 20.

A number of input quantities/measured quantities 7 as well as a number of output values 8, 20 are possible, so that the signal at different locations along the entire signal path can be involved in the control, or alternatively the control can intervene at a number of selected locations in the signal path.

In the following, circuit-oriented embodiments, the realization of the fuzzy logic components that are required ensues in analog circuit technology. Fuzzy logic operations can be simulated as algorithms that are executed using digital logic and operation units. Particularly due to the limited, small installation space for the circuit components given in hearing aids, a purely digital circuit realization cannot be implemented without further difficulty given currently available standard technology, since the area required for the digital circuit technology on an integrated circuit for hearing aids is not usually available. Moreover, the required power consumption would be too high for a hearing aid, since the digital operation unit would have to operate with a high clock frequency in order to realize all necessary operations in real time. A digital realization, further, would lead to a pronounced disturbance of the analog signals due to the digital circuitry.

Figure 13:
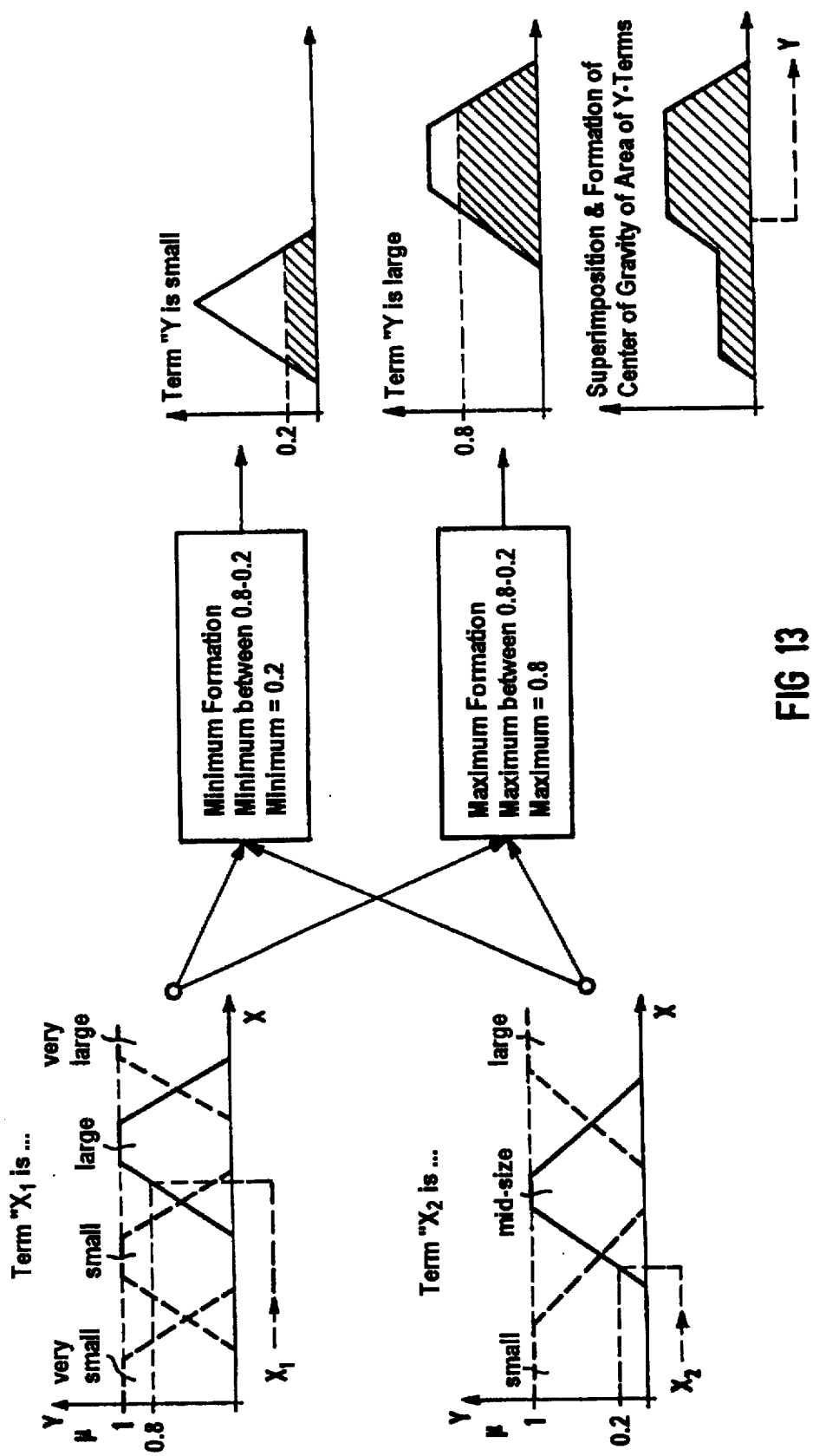
FIG. 13 is an exemplary illustration of the basic principle for a simple fuzzy logic control unit and the processing thereof.

FIG. 13 shows a simple fuzzy logic set of rules and the basic processing thereof. A first step for the implementation of a fuzzy logic structure is the definition of the linguistic variables for its input and output quantities. The terms for each of these quantities are entered relative to a numerical value scale. Variable quantities are shown along the x-axes of the indicated coordinate graphs, whereby the value μ on the y-axis indicates the degree of satisfaction or truth of the respective statement.

The following rule set derives from the example shown in FIG. 13:

1. If $x_1$ is large and $x_2$ is medium then y is small
2. If $x_1$ is large or $x_2$ is medium then y is large.

The following sub-functions must be realized for a circuit-oriented conversion of this exemplary fuzzy logic rule set:

Fuzzification: Imaging of the input values onto the linguistic variables, i.e. calculation of the values of the membership functions of each and every input quantity with respect to the individual terms of the relevant linguistic variables. The formation of the complement of the calculated value may possibly be necessary.

Calculation of minimums (as realization of the logical AND) and maximums (as realization of the logical OR) of the activated linguistic variables operated with one another.

Superimposition of the activated output terms and formation of the areal center of gravity of their area.

Specifically for the illustrated, analog circuit-oriented realization of the fuzzy logic operations, an preprocessing of the input signal and formation of a unit signal/reference signal that is also required are necessary before the actual processing. Since operation is undertaken with current signals rather than with voltage signals, these current signals must be duplicated in sufficient number before their further-processing. Moreover, they are partly needed in positive, partly in negative current flow directions for the further processing.

Figure 3:
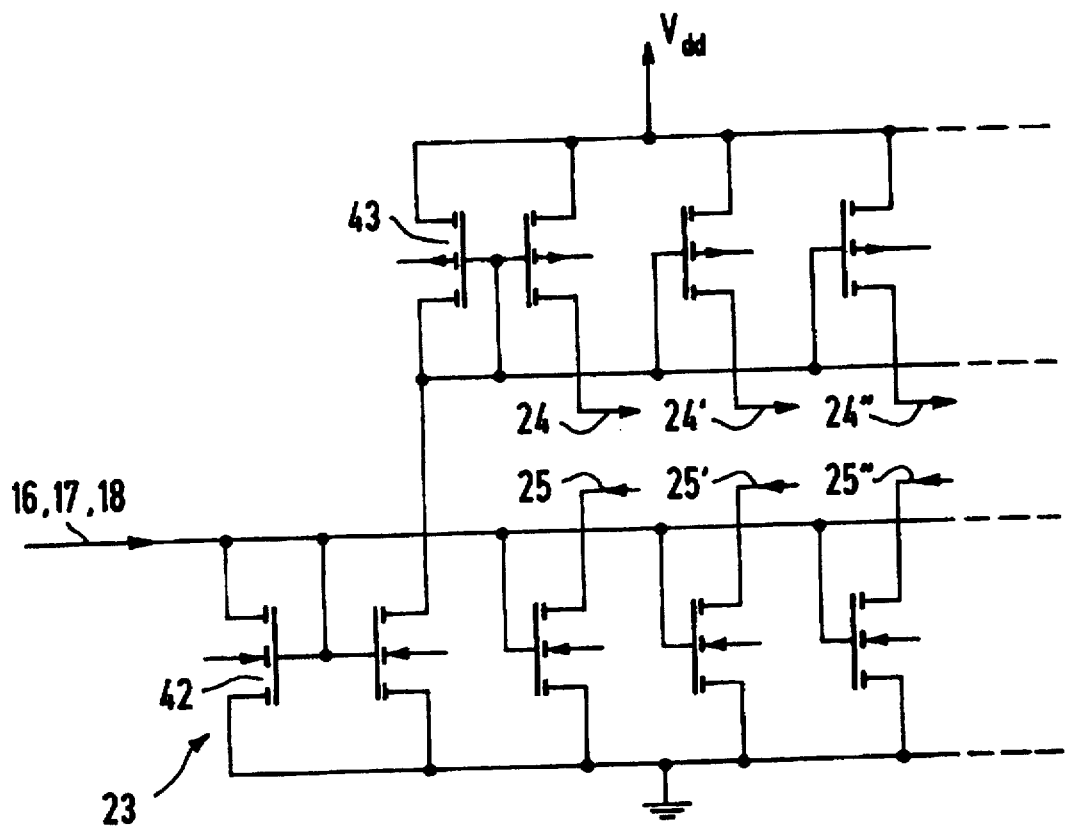
FIG. 3 shows a current mirror circuit that multiply forms an input current signal and a unit current signal (reference signal) for the fuzzification components of the fuzzy logic controller in both flow directions.

The duplicating as well as the directional reversal ensue with a known current mirror circuits 23 according to FIG. 3. The current mirror circuit 23 is constructed using N-MOS transistors 42 and P-MOS transistors 43. According to the invention, each signal 16, 17 and 18 supplied to the fuzzification stage 9 is supplied to a current mirror 23 and is converted into a plurality of current signals 24, 24' and 24" of the same size and having the same, first direction as well as signals 25, 25' and 25" having the same size but an opposite, second direction of current. The voltage Vdd indicates the circuit terminal to the supply voltage.

Figure 4:
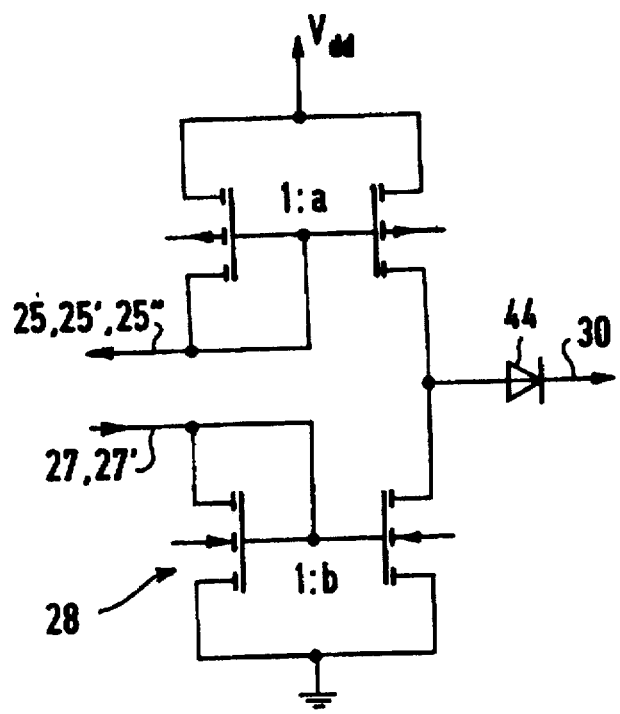
FIG. 4 shows a circuit of the fuzzy logic controller for processing current signals and unit current signals for the formation of the linguistic terms.
Figure 6:
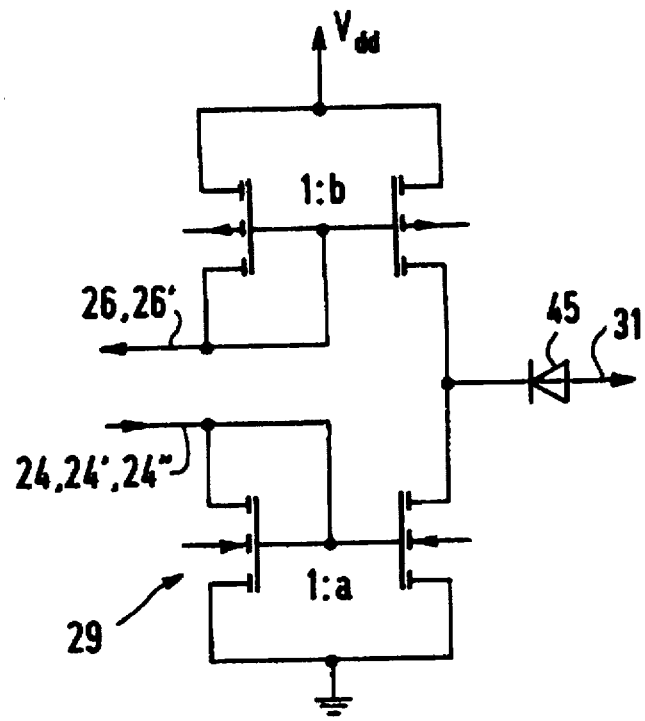
FIG. 6 shows a further circuit of the fuzzy logic controller for processing current signals and unit current signals for the formation of the linguistic terms.

The fuzzification (identification of the membership degree of the input signals with respect to the individual terms of the linguistic variables) ensues with two circuits 28 and 29 respectively shown in FIGS. 4 and 6. Each of the two circuits 28 and 29 thereby realizes a sub-segment of the membership function.

Functioning of the Circuits 28 and 29

Unit current signals 26 and 26' or, respectively, 27 and 27' are respectively supplied to the transistor circuits 28 and 29.

Figure 5:
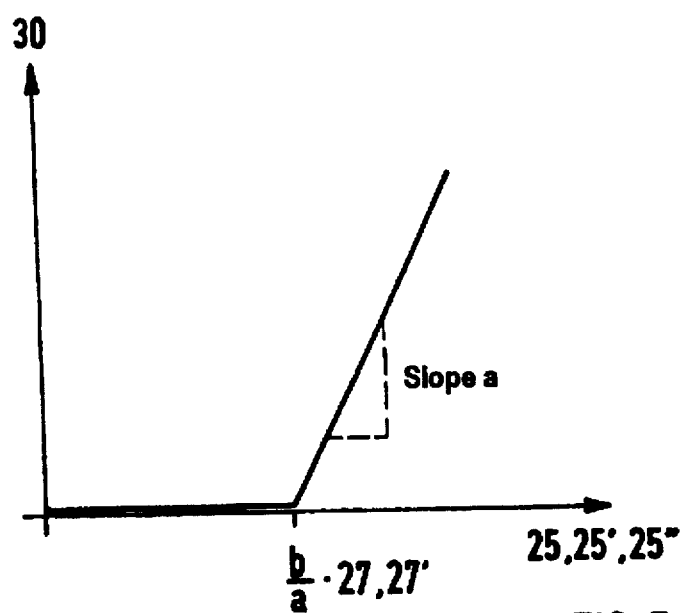
FIG. 5 illustrates an input quantity on a sub-segment of a linguistic term, related to the circuit of FIG. 4.
Figure 7:
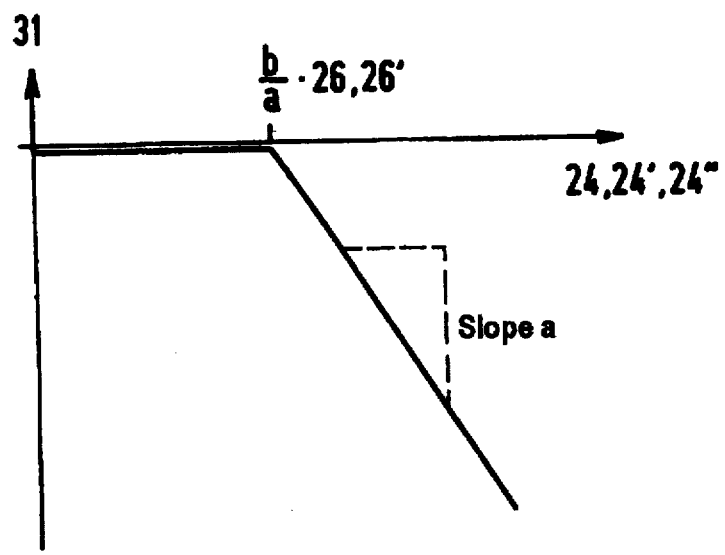
FIG. 7 illustrates an input quantity on a sub-segment of a linguistic term, related to the circuit of FIG. 6.

These signals can be produced by a predetermined unit current signal/reference signal being duplicated into the corresponding unit current signals 26 and 26', and 27 and 27', by means of a current mirror of this type. The unit current value of these reference current signals corresponds to the maximum value 1 of the current signals 24, 24' and 24", or 25, 25', 25". As a result of an appropriate dimensioning of the current mirrors 28 and 29 (i.e., design of the transistor size relationships), the supplied current signals 24, 24', 24", or 25, 25', 25", are mirrored in the ratio 1:a from the input side onto the output side and the unit current signals 26 and 26', or 27 and 27', are mirrored in the ratio 1:b. As a result of the blocking effect of the respective diodes 44 and 45 in one direction, the current transfer relationships respectively shown in FIG. 5 or 7 arise. The quantities a and b represent the transistor size relationships in the circuits 28 and 29. At the same time, the quantities a and b appear in the characteristics of FIGS. 5 and 7 that belong to the circuits 28 and 29. According thereto, the output current values 30 and 31 of the respective circuits 28 and 29 are equal to 0 until the value of the supplied current signals 25, 25' and 25" or 24, 24', 24" exceeds the value b/a times the respective unit or reference signal, i.e., b/a times one of the signals 26, 26', 27 or 27'. The respective output current values 30 and 31 then increase linearly with the slope a or, respectively, decrease linearly with the slope a. The design of the transistor size relationships a or, respectively, b of the transistor circuits constructed with the N-MOS and P-MOS transistors defines the course of the curve of the output current values 30 and 31. As a result of a superimposition of the sub-segments formed by the circuits 28 and 29 (which corresponds to a parallel connection of the respective, correspondingly dimensioned circuit parts), any desired membership function can be approximated from straight segments. The circuit outlay becomes lower as the approximation becomes coarser, i.e., as fewer straight segments are employed.

Figure 8:
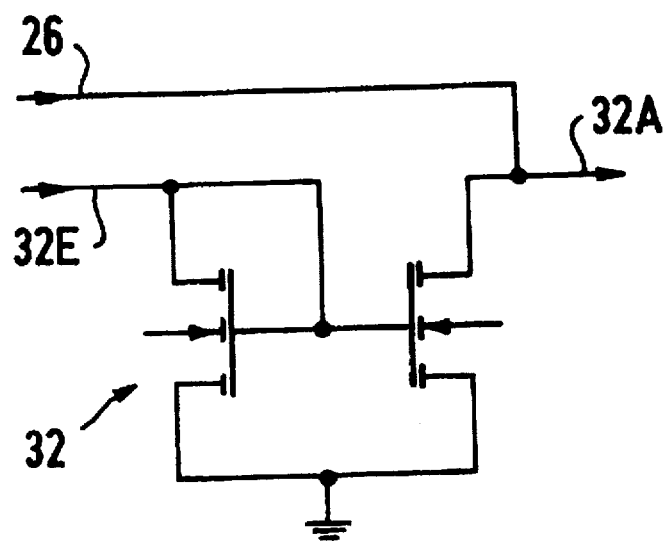
FIGS. 8 and 9 show respective current mirror circuits for forming the complement given the occurrence of a negation in the set of rules to be implemented these circuits respectively following groups of circuits according to FIG. 4 or 6.
Figure 9:
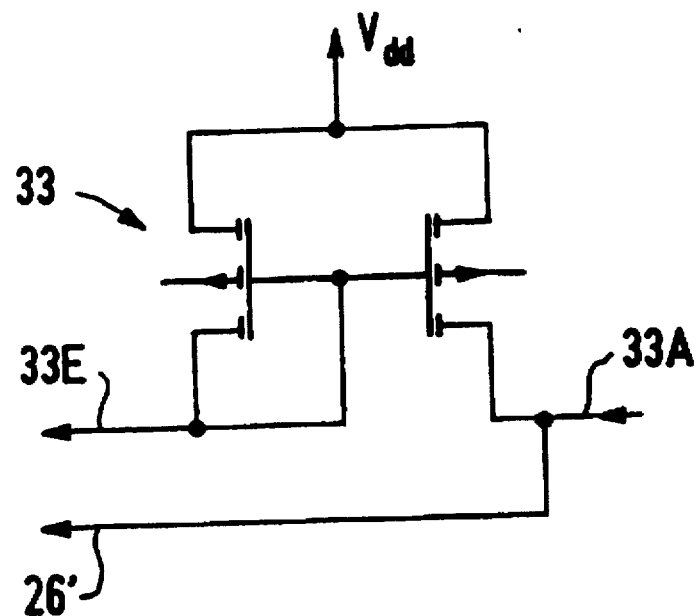

When a negation in the rule set requires the formation of the complement of one or more linguistic terms, then this can ensue in that one of the circuits according to FIGS. 8 and 9 which respectively follow the above-described circuit groups. According to FIGS. 8 and 9, the output current values 32A and 33A of the respective current mirror circuits 32 and 33 arise from the difference between the unit or reference current 26 or 26' and an input current signal 32E or 33E. For example, the output current value 32A arises from the unit current/reference current 26 minus the current value of the input current signal 32E, whereby the unit current 26 has the value 1 and the input current signal 32E has a value between 0 and 1.

Inference Formation

Figure 10:
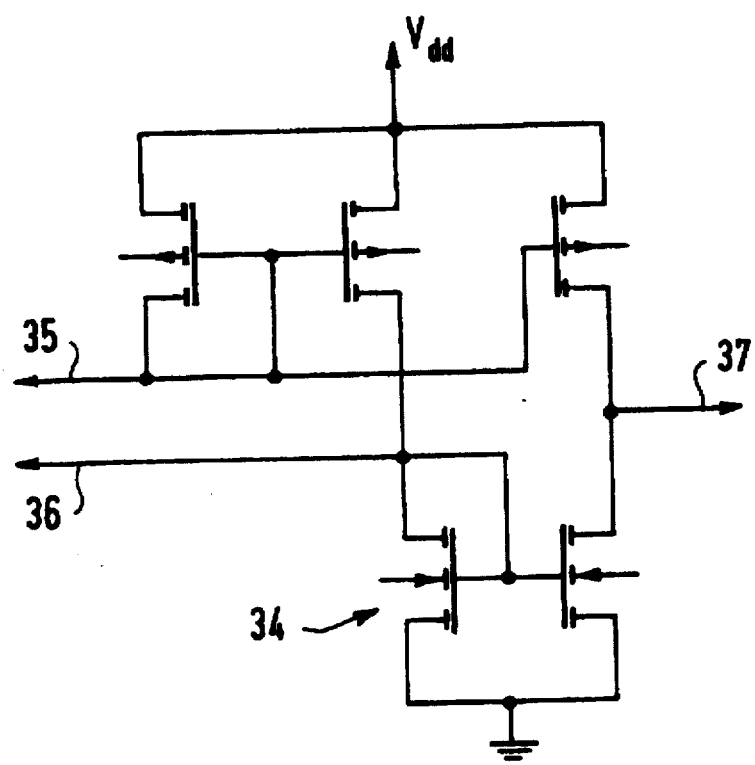
FIGS. 10 and 11 show circuit arrangements for respectively realizing the logic operations AND and OR by means of minimum and maximum formation.
Figure 11:
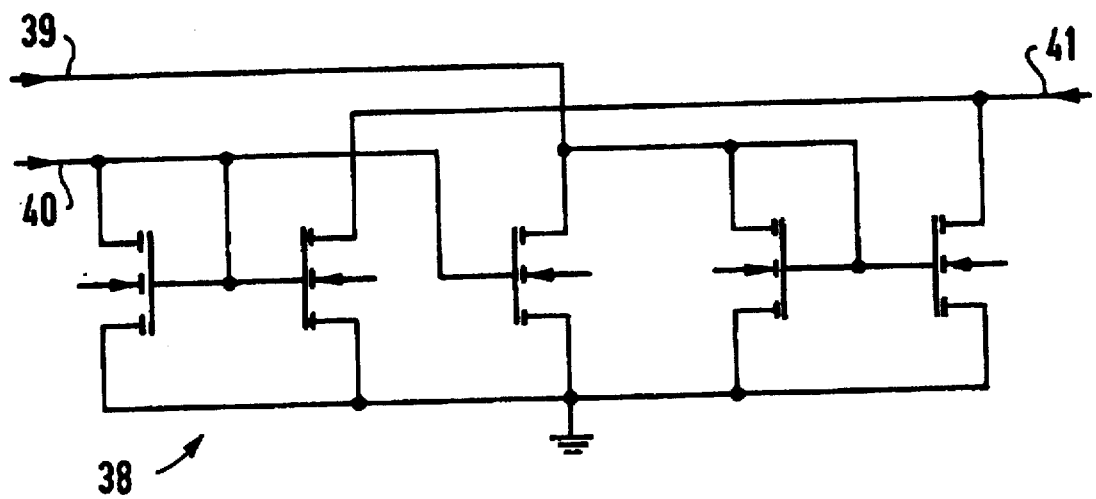

When the two logical operations AND and OR are realized as a minimum and maximum formation, as is usually standard, then the two circuits 34 and 38 of FIGS. 10 and 11 can be utilized for this purpose. The respective output current signals 37 and 41 of the circuit 34 of FIG. 10 or of the circuit 18 of FIG. 11 represent the minimum (FIG. 10) or the maximum (FIG. 11) of the two input current signals 35 and 36 or 39 and 40. When more than two input quantities are to be processed, then the appertaining circuits can be appropriately cascaded.

Defuzzification (superimposition of the activated output terms and formation of the center of gravity of the area)

Figure 12:
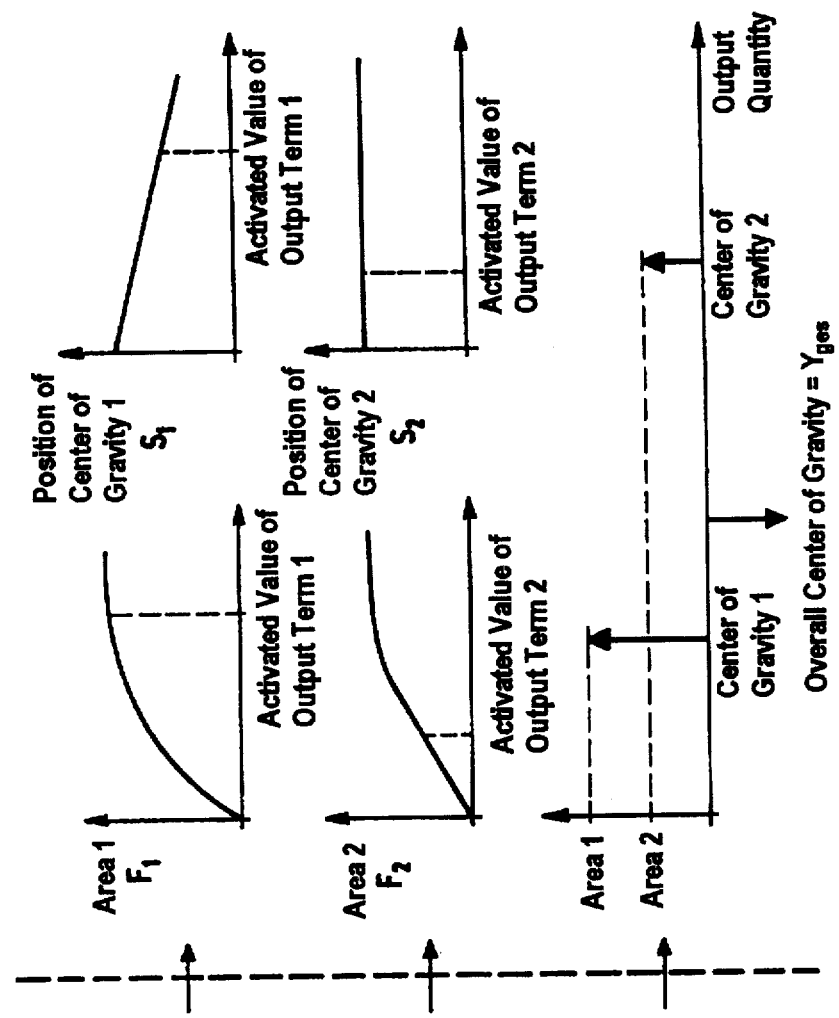
FIG. 12 illustrates the superimposition of the activated output terms and the formation of their center of gravity with two calculation formulas.
Figure 12:
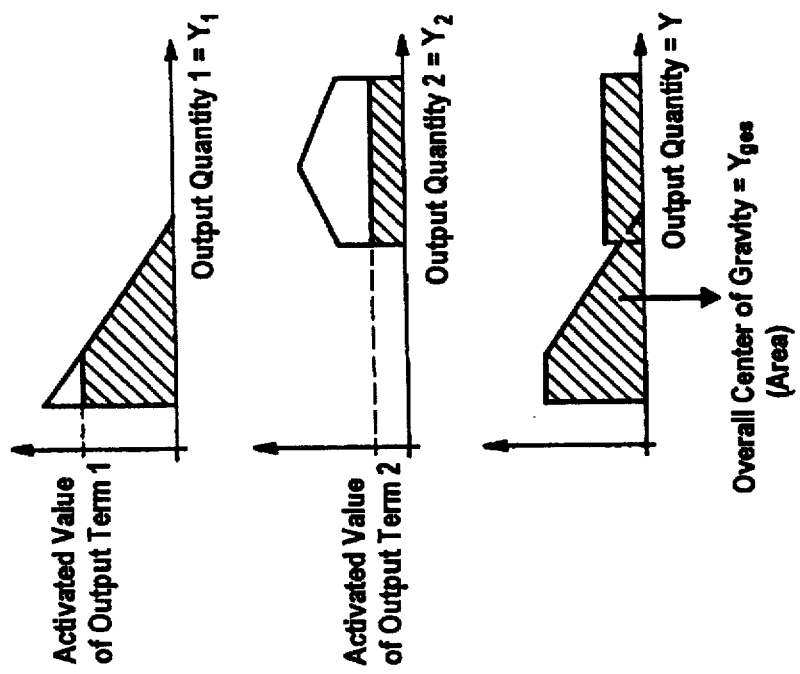

This operation can be implemented in digitally realized fuzzy logic systems with the assistance of an algorithm. For the conversion in analog technology, by contrast, it is necessary to switch to a different formal presentation of these operation steps, as shown in FIG. 12. The activation of an output term actually supplies two values, namely the activated area of the output term and the associated center of gravity of that area. Both quantities can therefore also be separately presented, namely as two separate functions of a common variable. It can then be realized in circuit-oriented terms fundamentally in exactly the same way as the above-explained membership functions. The superimposition of the activated output terms and the formation of their common center of gravity of the area (defuzzified output value) now occurs with the calculating operation recited in FIG. 12 according to the equation $$Y_{ges} = \frac{\sum_{n=1}^{N} S_n \cdot F_n}{\sum_{n=1}^{N} F_n}$$

wherein $Y_{ges}$=crisp output value (overall center of gravity)

$S_n$=position of the center of gravity of the $n^{th}$ activated output term $F_n$=area of the $n^{th}$ activated output term N=number of all output terms.

Two values are formed in accord therewith. The first value arises from the sum of all activated areas multiplied by the respectively associated center of gravity of the activated area. The second value is the sum of all activated areas. When the first value is divided by the second value, the output value to be calculated arises. The operations for the multiplication and division can be realized with standard circuits of analog technology. The additions of the currents ensue in the circuit nodes.

The reversal of the flow direction of the current signals can be required at some interfaces between the circuit blocks shown here in the overall signal path of the fuzzy logic controller. This is then realized by utilizing conventional current mirrors.

Structure and Function of a Decision Stage of the Fuzzy Logic Controller

Figure 14:
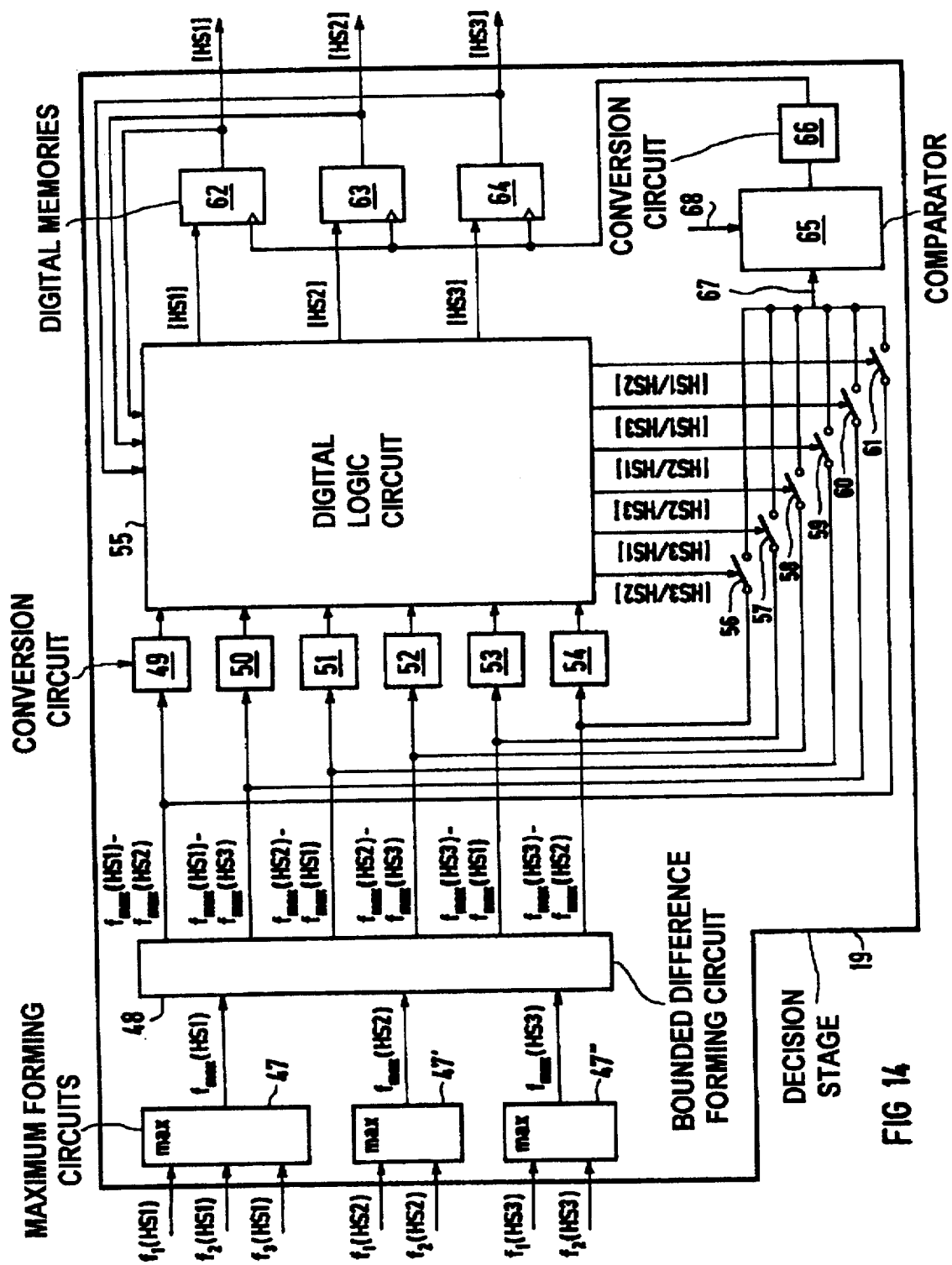
FIG. 14 is a block circuit diagram of the decision stage of the fuzzy logic controller having a selection function of, for example, three auditory situations HS1, HS2 and HS3 available for selection.

FIG. 14 shows an exemplary embodiment of a decision stage 19 of the fuzzy logic controller for a selection function of three auditory situations HS1, HS2 and HS3 available for selection.

If the output quantity of the controller 6 should not be a continuous value but is instead a decision quantity for one auditory situation from a plurality of possible auditory situations or one parameter value from a plurality of possible parameter values, then what is referred to as a "1 of N" decision must follow the inference instead of the defuzzification.

Given a two-channel hearing aid, a simplified example of a rule set which describes such a decision could read:

if level in channel 1 is low and level in channel 2 is low then auditory situation HS1 if level in channel 1 is medium and level in channel 2 is medium then auditory situation HS1 if level in channel 1 is low and level in channel 2 is high then auditory situation HS1 if level in channel 1 is medium and level in channel 2 is low then auditory situation HS2 if level in channel 1 is high and level in channel 2 is medium then auditory situation HS2.

When a 1 of N decision is made at the output of the fuzzy logic controller 6, it must be assured that a constant switching back and forth between two or more decisions does not occur given the presence of corresponding boundary conditions. This can be avoided by producing a hysteresis for the switching decision by calculating the difference between the strength of the currently proposed decision and the strength of the momentarily set decision. A switching will then occur only when this difference upwardly exceeds a specific, predetermined threshold.

The block circuit diagram of FIG. 14 shows a possible realization of the 1 of N selection function, whereby three auditory situations HS1, HS2 and HS3 are available for selection as an example. For discontinuous modification of the transmission behavior, a selection of stored values ensues in the decision means component 19 of the controller 6. The decision stage 19 thereby includes first circuits 47, 47' and 47" for the formation of the respective maximum of all activated terms for each decision alternative, whereby input current signals F1 (HS1), F2 (HS1), F3 (HS1); F1 (HS2), F2 (HS2); F1 (HS3), F2 (HS3) from the inference-forming component 10 are supplied to these circuits and are processed in these circuit to form an output current signal fmax (HS1), fmax (HS2), fmax (HS3) representing the maximum. FIG. 11 shows an embodiment of a circuit arrangement for maximum formation.

In a further function block, the decision stage 19 has circuits 48 for forming all bounded differences from the output quantities of the first circuits 47, 47' and 47". The bounded difference: A–B=A–B when A>B; A–B=0 when A<B. To this end, each input current signal is duplicated often enough via a current mirror 23 and in both flow directions and all signals to be processed with one another are then supplied to a current mirror 32 or 33 with the following diode, this forming the limited difference therefrom. These results are digitized by conversion circuits 49–54 for the conversion of a respective analog current signals into digital voltage signals which are supplied to a digital circuit 55. This digital circuit 55 forms the following digital quantities according to simple logical rules:

The proposal for auditory situation HS1 is the strongest [HS1]

The proposal for auditory situation HS2 is the strongest [HS2]

The proposal for auditory situation HS3 is the strongest [HS3]

The proposal for HS1 is the strongest and HS2 is active at the moment [HS1/HS2]

The proposal for HS1 is the strongest and HS3 is active at the moment [HS1/HS3]

The proposal for HS2 is the strongest and HS1 is active at the moment [HS2/HS1]

The proposal for HS2 is the strongest and HS3 is active at the moment [HS2/HS3]

The proposal for HS3 is the strongest and HS1 is active at the moment [HS3/HS1]

The proposal for HS3 is the strongest and HS2 is active at the moment [HS3/HS2].

Exactly one of the quantities [HS1], [HS2], [HS3] is always logically true. These quantities are conducted to the data inputs of digital memories means 62–64. The acceptance of these quantities into the memories 62–64, however, is dependent on a control signal that is only active when the proposal that is strongest at the moment is greater than the proposal for the auditory situation active at the moment by a predetermined minimum.

To that end, the signals [HS1/HS2], [HS1/HS3], [HS2/HS1], [HS2/HS3], [HS3/HS1], [HS3/HS2] control switches 56–61 in such a way that the bounded difference between the strength of the auditory situation proposal strongest at the moment and the strength of the auditory situation active at the moment is supplied as signal 67 to a comparator 65 that compares the signal 67 to a predetermined reference signal 68. To this end, the bounded difference is in turn formed between the reference value 68 and the signal 67. The output is in turn digitized in a conversion circuit 66. The control signal for the acceptance of the selection signals into the data memory only becomes active when the reference value is upwardly exceeded. As a result, the above-described hysteresis is assured for the switching decision.

It must again be noted that in the circuit for the decision stage 19 all analog quantities are represented by currents, but the digital quantities are represented by voltage levels. When a current signal is multiply evaluated or further processed in the circuit, it is duplicated sufficiently often with the assistance of current mirrors. The functions of maximum formation and formation of the limited difference are basic functions of the fuzzification and inference formation and are already discussed in the description of these components.

Figure 15:
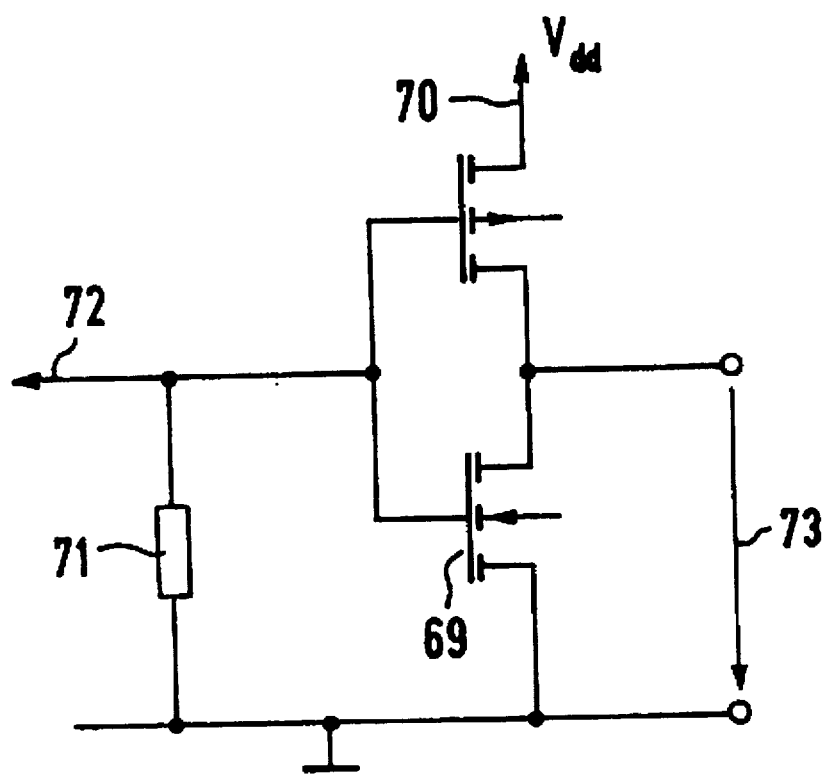
FIG. 15 a circuit for converting an analog current signal into a digital voltage signal for use in the invention.

As shown in FIG. 15, the conversion circuits 49–54 as well as 66 for the conversion of a respective analog current signal 72 into a digital voltage signal 73 are each respectively composed of an N-MOS transistor 69 and a P-MOS transistor 70 as well as at least one resistor 71. The output voltage signal 73=supply voltage Vdd when the input current signal 72>0 and the output voltage 73=0 when the input current signal 72<0.

A hearing aid inventively provided with a controller as described herein is distinguished by better adaptation of the hearing aid to the hearing impairment of the wearer on the basis of continuous, signal-dependent setting of signal processing parameters. Further, such a hearing aid relieves the wearer of the hearing aid of repetitive manual adjustments, by undertaking of an automatic selection of signal processing parameters or sets of signal processing parameters/auditory situations.

Although modifications and changes may be suggested by those skilled in the art, it is the intention of the inventors to embody within the patent warranted hereon all changes and modifications as reasonably and properly come within the scope of their contribution to the art.

I claim as my invention:

1. A programmable hearing aid comprising:

a microphone for receiving incoming audio signals;

amplifier and transmission means, connected to said microphone, for operating on audio signals received by said microphone to amplify and transmit said audio signals with settable transmission characteristics, to correct a hearing deficiency, defined by a parameter set, said amplifier and transmission means having input means for receiving a signal which identifies said parameter set to set said transmission characteristics;

an earphone, connected to said amplifier and transmission means, for emitting an audio signal operated on by said amplifier and transmission means;

fuzzy logic controller means, supplied with quantities from said amplifier and transmission means derived from said incoming audio signals which characterizes a current ambient auditory situation, and connected to said input of said amplifier and transmission means for supplying a signal to said amplifier and transmission means for producing said parameter set therein, dependent on said quantity, which is matched to said current ambient auditory situation according to fuzzy logic for continuously and automatically maintaining said transmission characteristics at respective settings for correcting said hearing deficiency said fuzzy logic controller means comprising fuzzification means for fuzzification of signals corresponding to said quantities, and wherein said fuzzification means comprising an analog circuit having current mirror circuit means, to which said signals corresponding to said quantities are supplied, for converting said signals corresponding to said quantities into first signals having a magnitude and a current direction and second signals having the same magnitude and an opposite current direction; and a housing having a size and shape allowing said housing to be worn at an ear of a person having said hearing deficiency, said housing containing said microphone, said amplifier and transmission means and said earphone.

2. A programmable hearing aid as claimed in claim 1 further comprising data carrier means, connected between said fuzzy logic controller means and said amplifier and transmission means, for storing a plurality of parameter sets, and wherein said fuzzy logic controller means comprises means for supplying a signal to said data carrier means dependent on said quantities for selecting one of said parameter sets according to fuzzy logic matched to said current ambient auditory situation, and wherein said data carrier means comprises means for supplying the parameter set selected by said fuzzy logic controller means to said input of said amplifier and transmission means.

3. A programmable hearing aid as claimed in claim 1 wherein said fuzzy logic controller means comprises means for continuously generating control signals dependent on said quantities according to fuzzy logic and for supplying said control signals to said input of said amplifier and transmission means for continuously setting said transmission characteristics thereof.

4. A programmable hearing aid as claimed in claim 1 wherein said fuzzy logic controller means further comprises signal preprocessing means for preprocessing said quantities from said audio signals supplied from said amplifier and transmission means for producing preprocessed signals;

said fuzzification means for fuzzification of said preprocessed signals to produce fuzzy signals;

fuzzy inference formation means, supplied with said fuzzy signals, for forming a control signal which identifies the parameter set matched to the current ambient auditory situation; and defuzzification means for defuzzification of said fuzzy signals.

5. A programmable hearing aid as claimed in claim 4 wherein said signal preprocessing means comprises means for rectifying said quantities.

6. A programmable hearing aid as claimed in claim 4 wherein said signal preprocessing means comprises means for averaging said quantities.

7. A programmable hearing aid as claimed in claim 4 wherein said signal preprocessing means comprises means for time differentiating said quantities.

8. A programmable hearing aid as claimed in claim 1 wherein said fuzzy logic controller means further comprises:

means for preprocessing said quantities from said audio signals supplied from said amplifier and transmission means for producing preprocessed signals;

said fuzzification means for fuzzification of said preprocessed signals to produce fuzzy signals;

fuzzy inference formation means, supplied with said fuzzy signals, for forming a plurality of further fuzzy signals from said fuzzy signals; and decision means, connected to said fuzzy inference formation means, for selecting one from a predetermined set of output values dependent on said further fuzzy signals, said one of said output values determining the parameter set matched to said current ambient auditory situation.

9. A programmable hearing aid as claimed in claim 8 wherein said signal preprocessing means comprises means for rectifying said quantities.

10. A programmable hearing aid as claimed in claim 8 wherein said signal preprocessing means comprises means for averaging said quantities.

11. A programmable hearing aid as claimed in claim 8 wherein said signal preprocessing means comprises means for time differentiating said quantities.

12. A programmable hearing aid as claimed in claim 8 wherein said decision means comprises means for making a decision from a plurality of decision alternatives, and comprises:

means for forming a maximum analog signal for each decision alternative from all activated terms for that decision alternative;

means for forming a bounded difference analog signal from said maximum analog signals from said means for forming a maximum analog signal;

conversion circuit means for converting said analog bounded difference signals into respective digital voltage signals;

digital circuit means, supplied with said digital voltage signals, for operating on said digital voltage signals according to digital logic rules to produce one and only one output quantity which is logically true given said current ambient auditory situation;

digital memory means to which said output quantity is supplied; and means for producing a bounded difference signal between a reference signal and one of said analog maximum signals;

conversion circuit means for converting said bounded difference signals into respective digital voltage signals for controlling said digital memory means to produce an output of said decision means which identifies a parameter set matched to said current ambient auditory situation.

13. A programmable hearing aid as claimed in claim 12 wherein said activated terms comprise current signals and wherein said output signal of said decision means comprises a current signal.

14. A programmable hearing aid as claimed in claim 12 wherein said means for forming a bounded difference analog signal comprises means for duplicating each of said maximum analog signals in opposite current directions using said current mirror means, and wherein said means for forming said bounded difference analog signal comprises a current mirror followed by a diode.

15. A programmable hearing aid as claimed in claim 12 wherein said conversion means for converting said analog current signals into digital voltage signals comprise an N-mos transistor and P-mos transistor and at least one resistor.

16. A programmable hearing aid as claimed in claim 1 wherein said fuzzy logic controller means comprises control means for operating on said quantities supplied from said amplifier and transmission means according to fuzzy logic, and data memory means, connected to said control means, for storing fuzzy logic rules fetchable by said control means.

17. A programmable hearing aid as claimed in claim 1 wherein said hearing aid is operable in a plurality of operating modes and comprising a battery for supplying power to said microphone, said amplifier and transmission means, said earphone and said fuzzy logic controller means, and further comprising means for supplying signals to said fuzzy logic controller means identifying at least one of a current operating mode and a battery condition, and wherein said fuzzy logic controller means comprises means for employing said at least one of said signals in producing the signal supplied to said input of said amplifier and transmission means.

18. A programmable hearing aid as claimed in claim 1 wherein said fuzzification means includes means for generating a reference signal, reference signal current mirror means for converting said reference signal into a plurality of unit current signals, and means for combining said first and second current signals and said unit current signals to form a plurality of output current values, and means for superimposing said output current values to form linguistic terms of said fuzzy logic controller means.

19. A programmable hearing aid as claimed in claim 18 further comprising complement-forming mirror circuit means for forming a complement of any of said linguistic terms when required by the rule set to be implemented.

20. A programmable hearing aid as claimed in claim 1 wherein said fuzzy logic controller means comprises an inference formation means used in operating on signals corresponding to said quantities for producing said input to said amplifier and transmission means, said inference formation means comprising an analog circuit.

21. A programmable hearing aid as claimed in claim 20 wherein said inference formation means includes means for performing a logic AND function by forming a minimum of input signals to said means for performing a logic AND function.

22. A programmable hearing aid as claimed in claim 20 wherein said inference formation means includes means for performing a logic OR function by forming a maximum of input signals supplied to said means for performing a logic OR function.

23. A programmable hearing aid as claimed in claim 1 wherein said fuzzy logic controller means includes defuzzification means for operating on said quantities for producing said input to said amplifier and transmission means, said defuzzification means comprising an analog circuit.

24. A programmable hearing aid as claimed in claim 23 wherein said defuzzification means comprises means for forming crisp output values $Y_{ges}$ which have an overall center of gravity of area of a plurality of activated linguistic terms from said inference formation means according to the expression $$Y_{ges} = \frac{\sum_{n=1}^{N} S_n \cdot F_n}{\sum_{n=1}^{N} F_n}$$

wherein $Y_{ges}$=crisp output value (overall center of gravity)

$S_n$=center of gravity position of the $n^{th}$ activated output term $F_n$=area of the $n^{th}$ activated output term $N$=number of all output terms.

* * * * *